United States Patent [19]

Fayoux et al.

[11] Patent Number: 4,676,902
[45] Date of Patent: Jun. 30, 1987

[54] SEPARATION APPARATUS INCLUDING RELATIVELY MOVABLE PRESSER MODULE AND FILTRATION BELTS

[75] Inventors: Christian Fayoux, Grigny II; André Haubry, Mezy, both of France

[73] Assignees: Degremont, Ruell Malmaison; Filtres Philippe S.A., Houilles, both of France

[21] Appl. No.: 755,349

[22] Filed: Jul. 16, 1985

[30] Foreign Application Priority Data

Jul. 25, 1984 [FR] France .................. 84 11804

[51] Int. Cl.$^4$ .......................................... B01D 29/02
[52] U.S. Cl. ................................... 210/350; 210/400; 210/401; 209/431; 100/211; 100/222; 100/226
[58] Field of Search ............... 210/224, 231, 350, 351, 210/385, 387, 388, 389, 400, 401, 769, 770; 209/309, 307, 310, 365 A, 431, 470; 100/295, 296, 211, 222, 226; 162/18, 56, 203, 210, 220, 227, 268, 289, 305, 348, 382, 401, 402

[56] References Cited

U.S. PATENT DOCUMENTS

3,695,440 10/1972 Mori ..................... 210/231
4,153,550 5/1979 Lautrette .................. 210/770
4,211,162 7/1980 Bastgen .................... 210/769
4,292,173 9/1981 Parmentier .................. 210/231

FOREIGN PATENT DOCUMENTS

0064991 11/1982 European Pat. Off. .
2043156 3/1971 Fed. Rep. of Germany .
3221435 12/1983 Fed. Rep. of Germany .
2188496 1/1974 France .
2374937 7/1978 France .
2389401 12/1978 France .

Primary Examiner—Richard V. Fisher
Assistant Examiner—Wanda L. Millard
Attorney, Agent, or Firm—Wenderoth, Lind & Ponack

[57] ABSTRACT

Apparatus for the separation of the liquid phase of a solid-liquid suspension, in which the suspension previously thickened is disposed between two endless filtration bands and is subjected to pressure by a presser module to which is imparted a reciprocating motion, includes at least two tight enclosures, juxtaposed and disposed parallel with respect to each other. Each enclosure is provided with an inflatable membrane providing filtration pressure.

4 Claims, 1 Drawing Figure

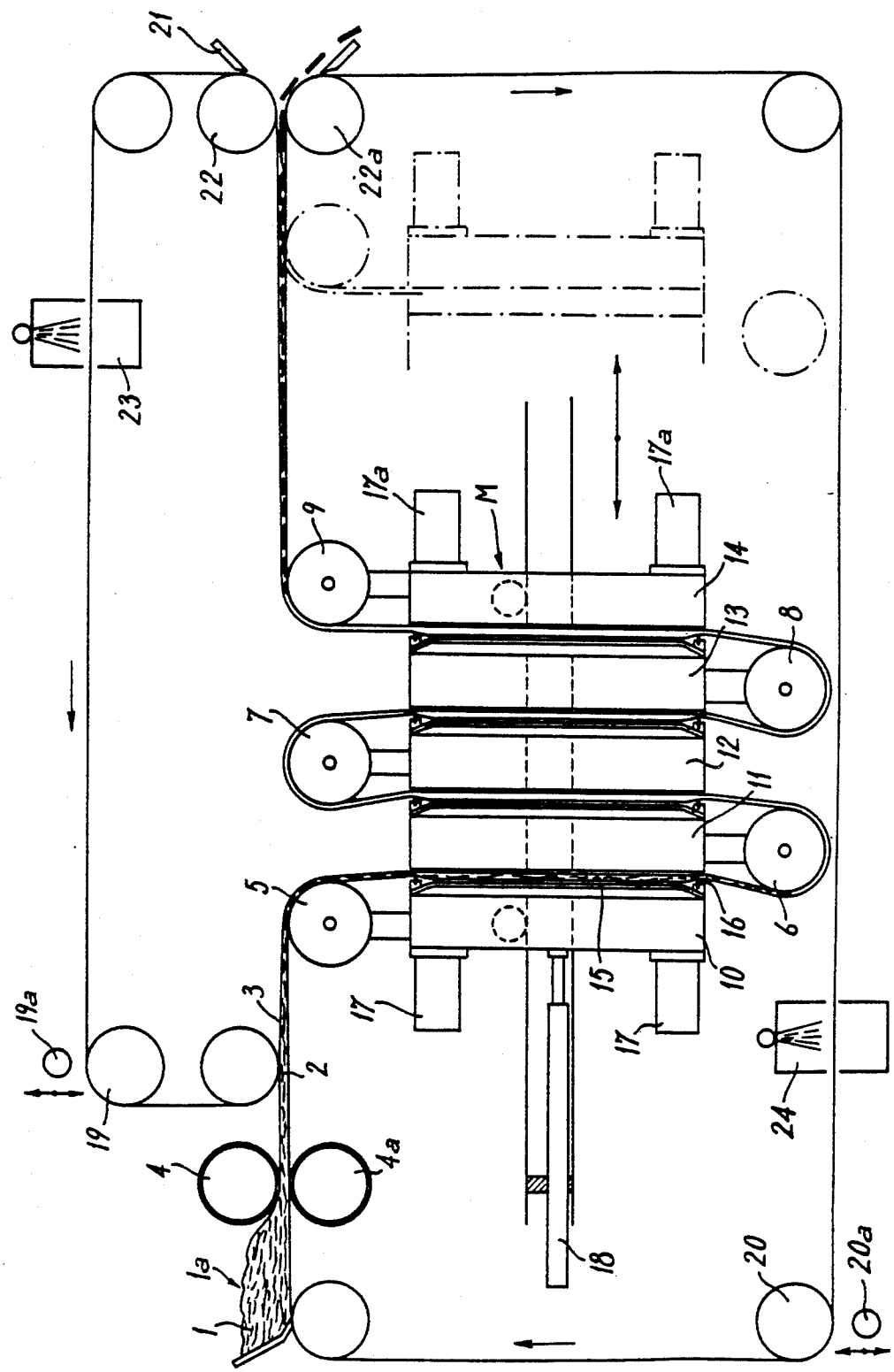

SEPARATION APPARATUS INCLUDING RELATIVELY MOVABLE PRESSER MODULE AND FILTRATION BELTS

FIELD OF THE INVENTION

The present invention relates to an apparatus for the separation of the liquid phase of a solid-liquid suspension, notably applicable to the partial elimination of water contained in the solid-liquid suspension formed by the sludge from water treatment installations.

PRIOR ART

Many apparatus such as filter presses, vacuum filters, centrifugal machines, filters with presser bands have been disclosed, to permit the separation of the liquid phase from a solid-liquid suspension. Such apparatus however have certain disadvantages, i.e. low extraction efficiency of the liquid phase for some of them, handling and exploitation difficulties for others.

It is known that the most often used technique is the setting under pressure of the suspension on a filtration medium, such as fibers or natural threads, synthetic or metallic, chosen as a function of their property with respect to the suspension to be treated.

However, the pressure applicable is limited by the suspension physical characteristics, notably the evolution of its viscosity, in order to avoid any departure of the suspension outside the separation interface formed by the filtration medium.

Known apparatus remedy this disadvantage by using a closed enclosure retaining the suspension, the enclosure wall forming the separation interface. The disadvantage of such apparatus resides in the discontinuity of the operation, caused by the fact that at a given moment it becomes necessary to discharge the concentrated suspension, called "cake", from the inside of the enclosure.

Such operation is most often lengthy and requires much labor.

On the other hand, it is known that the performance of an apparatus for separation of the liquid phase of a solid-liquid suspension is linked to the dimensions of the sepation enclosure and also to the concentration of the suspension fed to the apparatus.

French patent published under No 2 374 937 discloses a method for the continuous filtration of a mass impregnated with a liquid, in which a pressure is exerted in a discontinuous manner on successive portions of the mass to be filtrated and which moves continuously, and an apparatus for practicing the method and comprising a belt conveyor driven continuously, on which is deposited the mass to be filtrated and which is subjected to a high pressure by means of a mobile presser module, in a unicellular closed chamber. To the presser module is imparted a cyclical motion comprising, in a first period, the application of the pressure on the liquid impregnated mass and the displacement of the press in synchronism with the belt conveyor and, in a second period, the loosening of the pressure and the return of the module to its starting point.

Such an apparatus is continuously fed with liquid sludge and provides a continuous production of cake. The cake formed is extracted in an entirely automated manner. The method moreover has the possibility of varying the dry content of the cake as a function of the mass flow rate.

Yet, the mechanical imperatives linked to the presser module dimensions limit the filtration surface.

OBJECTS AND SUMMARY OF THE INVENTION

The improvement which is the object of the present invention allows greatly increasing the filtration surface while preserving the main interests of the method by transforming the unicellular presser module into a multicellular presser module with the juxtaposition of a plurality of filtration chambers.

The invention provides in an apparatus for the separation of the liquid phase of a solid-liquid suspension, in which the suspension previously thickened is disposed between two endless filtration bands and is subjected to a pressure by means of a presser module to which is imparted a reciprocating motion. The apparatus includes at least two tight enclosures, juxtaposed and disposed parallel with respect to each enclosure other, each being provided with an inflatable membrane providing the filtration pressure.

According to a feature of the invention, each enclosure is made of two plates or trays disposed opposite one another and one of the faces of which is provided with an inflatable membrane, the face of each plate which is provided with a membrane being placed in register with the face which is not provided with a membrane of the following plate or tray.

According to another embodiment of the invention, each enclosure is made of a solid plate associated with a frame enclosing a membrane.

According to preferred embodiment of the invention, the tightness of the filtration enclosures is provided by clamping the assembly of plates one on top of the other by pressure means, such as hydraulic or pneumatic jacks.

According to another embodiment of the invention, the tightness of the enclosure is provided by a mechanical clamping of the plates.

According to the invention, the module formed by the plurality of filtration enclosures is subjected to a reciprocating motion by means of any convenient device such as a jack, or via a mechanical drive, such reciprocating motion being effected at an adjustable speed and over an adjustable distance.

Also according to the invention, the endless filtration bands between which is disposed the solid-liquid suspension move in the filtration enclosures with a discontinuous motion, with short idle times, for example of 8 to 10 seconds, caused at regular intervals by clamping the bands between means such as rollers, during the return motion of the filtration module to its position of origin. Such dispositions determine, according to the invention, a relative displacement of the filtration bands and of the filtration module during the return motion of the latter and, consequently, a progression of the formed filtration cake toward the apparatus outlet.

Each filtration enclosure which is part of the constitution of the module is mobile and separable from the other enclosures. The enclosures are disposed in series, vertically or horizontally.

The use of a plurality of juxtaposed filtration enclosures makes it possible to exert a series of filtration actions on the same portion of the mass to be filtrated, and hence to achieve improved dehydration of the mass.

BRIEF DESCRIPTION OF THE DRAWING

In the following is described only by way of example, one possible embodiment of the invention, this description being made with reference to the the accompanying drawing which is a schematic transverse sectional view of this embodiment of the apparatus of the invention.

DETAILED DESCRIPTION OF THE INVENTION

As may be seen in the the accompanying drawing, a solid-liquid suspension 1 accumulated in area 1a and thickened in a known manner until a pasty state is reached by dewatering with or without a polyelectrolyte for example, or by passing on a vacuum table, is forwarded continuously between two endless filtration bands 2, 3, passing between rollers 4, 4a with settable distances between their axes for equalizing and adjusting the thickness of a space between bands 2, 3.

The endless bands are moved forward successively by means of rollers 5, 6, 7, 8, 9 into four successive enclosures made tight in a manner which will be described hereafter. Such enclosures are formed between the opposite faces of five plates 10, 11, 12, 13, 14 disposed in series. Each enclosure between adjacent plates is defined by a plane face, preferably grooved, on one plate and an opposite face on an adjacent plate and recessed for receiving a membrane 15 clamped between such adjacent plate and a peripheral edge 16 formed on the recessed face of such adjacent plate. In the succession of plates, the plain face of one is opposite the face having an edge 16 and provided with a membrane 15 of the adjacent plate.

The membrane 15, inflated by a liquid under pressure, ensure the filtration of the suspension during its passage through the enclosures. The admission of the fluid each of the membranes is adjustable settable and independent so as to provide a possibly different filtration pressure for each of the enclosures, such pressure being, in all hypothesis, independent of the filtration cake thickness.

The enclosure assembly forms a filtration module M on which are exerted two types of actions, in the example disclosed by means of double action jacks:

a clamping action of the enclosures on top of each other, by means of jacks 17, 17a, distributed into two opposed groups, each group acting on one of the module faces. During such action, each edge 16 protruding from the face of a plate with a membrane is pressed toward the filtration band which then is clamped between such edge and the plain face of the next adjacent plate. The complete tightness of the enclosure is thereby provided and the filtration, under the effect of the membrane, can be carried out in the enclosure. This is accomplished so that the clamping of the plates by jacks 17, 17a is totally independent of the filtration pressure. Thereby, there is avoided any risk of flow of the solid-liquid suspension upon reciprocating motion of module M, under the effect of a jack 18, between two positions, as can be seen in the drawing where an extreme position which can be reached by the module is shown in phantom lines.

Each filtration band passes between a pair of rollers 19, 19a, for band 3, or 20, 20a for band 2, such rollers being arranged such as to nip the bands therebetween and thereby cause the stopping of their motion.

The dehydrated filter cake is discharged at the apparatus outlet by means of scrapers 21, installed downstream of last rollers 22, 22a between which move the bands. Bands 3, 2 are each subjected to a continuous washing operation at respective stations 23, 24 prior to their return to the apparatus inlet.

Such apparatus operates in the following manner:

The pre-dehydrated solid-liquid suspension is continuously forwarded between the continuous bands 2 and 3, and the filtration enclosures are closed by plates 10–14 being clamped by means of jacks 17, 17a. This clamping action causes simultaneously the clamping of bands 2, 3 at the peripheries of the plates, thereby providing tightness of the enclosures.

When the clamping pressure reaches a predetermined value, jack 18 is fed with compressed fluid at a settable constant flow rate, causing forward motion toward the position shown in phantom of module M formed by the assembly of filtration enclosures, and also the displacement of the filtration bands 2, 3 which are at that moment clamped between the plate edges. Simultaneously, the compressed fluid is admitted behind the membranes 15 of the plates, with consequent application of pressure to the filtration enclosures, thus causing the extraction of the interstitial water from the solid-liquid suspension enclosed between the portions of bands 2, 3 which are at that moment between plates 10–14.

A proximity detector, the position of which is adjustable longitudinally, makes it possible to determine the displacement stroke of the module by causing, at the end of the stroke, the stopping of the compressed fluid feeding of jack 18, hence the stopping of module M as well as the decompression of the filtration enclosures.

The unclamping of the plates is then obtained by decompression of jacks 17, 17a, followed by feeding at a low pressure of the other faces of such jacks.

Means (not shown) such as links, provided between the opposite faces of the plates, connecting the displacement of the extreme plates 10, 14 to the intermediate plates 11, 12, 13 allow the simultaneous opening of all the filtration enclosures.

The opening operation being completed, a sensor detects the open state of the filtration enclosures and commands the clamping of endless band 2 between rollers 19, 19a and that of endless band 3 between rollers 20, 20a, thereby stopping for a rather brief lapse of time, for example of 8 to 10 seconds, the motion of the filtration bands. A clamping sensor of the endless bands the causes the accelerated return motion of module M to its starting position, by feeding the other face of jack 18 with compressed fluid.

Due to the immobilization of the endless bands 2, 3, the return motion of the module toward its starting position causes the displacement between plates 10–14 of the portions of bands 2, 3 enclosing the solid-liquid suspension which has been filtered. This relative motion of the module and of the bands drives progressively the filtrated cake toward the apparatus outlet.

A proximity detector, the position of which is adjustable longitudinally makes it possible to determine the return stroke of the module by commanding the stopping of the compressed fluid feed of jack 18 and the movement of rollers 19, 19a and 20, 20a away from each other, thus enabling the renewed setting in motion of the endless bands. The cycle starts again: closing of the enclosures by clamping of the plates, and so on. The displacement of the bands allows scraping the cake formed during a previous cycle.

What is claimed is:

1. In an apparatus for the separation of the liquid phase of a solid-liquid suspension, said apparatus comprising:
   a pair of endless filtration bands mounted for movement to define therebetween a space;
   means for feeding the suspension into said space;
   a presser module having a plurality of juxtaposed enclosures arranged parallel to each other, each said enclosure being defined by confronting faces of respective opposite plates, a first said face having mounted thereon an inflatable membrane and being aligned with a second said face;
   said pair of endless filtration bands and said space therebetween containing the suspension passing sequentially through said enclosures;
   means for simultaneously moving all of said plates together between a closed position, whereat said filtration bands and the suspension therebetween are clamped between said first and second faces of each said enclosure, and an open position, whereat said enclosures are open;
   means for pressing each said membrane into the respective said enclosure when said plates are in said closed position and thereby for pressing the liquid from the suspension therein, thus forming a filter cake; and
   means for reciprocating said presser module between starting and finishing positions and thereby for achieving displacements of said presser module with respect to said pair of filtration bands, said reciprocating means comprising fluid operated means for moving said presser module to said finishing position when said plates are in said closed position, thereby simultaneously moving said filtration bands, and for moving said pressure module to said starting position when said plates are in said open position.

2. An apparatus as claimed in claim 1, wherein each said first face is recessed and has a peripheral edge, and each said second face is grooved.

3. An apparatus as claimed in claim 1, wherein said moving means comprises at least one fluid operated jack.

4. An apparatus as claimed in claim 1, further comprising means for preventing movement of said filtration bands during movement of said presser module to said starting position, thereby enabling relative movement of said filtration bands with respect to said presser module in a direction toward an outlet of the apparatus.

* * * * *